(12) United States Patent
Kawaji et al.

(10) Patent No.: US 7,062,923 B2
(45) Date of Patent: Jun. 20, 2006

(54) COOLING METHOD FOR INTERIOR PORTION OF VEHICLE AND COOLING APPARATUS THEREOF

(76) Inventors: Masahiro Kawaji, 41-10, Mejirodai 2-chome, Hachioji-whi, Tokyo 193-0833 (JP); Yuichi Shibata, 13-6, Wakaba-cho 3-chome, Hitachi-shi, Ibaraki 317-0063 (JP); Kaoru Onoe, 501, 14-12, Shimouma 2-chome, Setagaya-ku, Tokyo 154-0002 (JP)

( * ) Notice: Subject to any disclaimer, the term of this patent is extended or adjusted under 35 U.S.C. 154(b) by 0 days.

(21) Appl. No.: 10/483,819

(22) PCT Filed: Jun. 20, 2002

(86) PCT No.: PCT/JP02/06190
§ 371 (c)(1),
(2), (4) Date: Aug. 2, 2004

(87) PCT Pub. No.: WO03/001121
PCT Pub. Date: Jan. 3, 2003

(65) Prior Publication Data
US 2004/0244387 A1    Dec. 9, 2004

(30) Foreign Application Priority Data
Jun. 22, 2001   (JP) .............................. 2001-190085

(51) Int. Cl.
*B60H 1/32*   (2006.01)
(52) U.S. Cl. ............................... 62/59; 62/236; 62/244
(58) Field of Classification Search ............... 62/59, 62/236, 239–244, 420–425
See application file for complete search history.

(56) References Cited

U.S. PATENT DOCUMENTS

| | | | | |
|---|---|---|---|---|
| 2,170,992 A | * | 8/1939 | Grady | ............................ 62/59 |
| 2,557,004 A | * | 6/1951 | Lepper | ........................ 62/245 |
| 2,802,347 A | * | 8/1957 | Marcus | ......................... 62/244 |
| 4,129,994 A | | 12/1978 | Ku | |
| 4,280,330 A | * | 7/1981 | Harris et al. | ................... 62/3.3 |
| 4,658,593 A | * | 4/1987 | Stenvinkel | .................... 62/126 |

FOREIGN PATENT DOCUMENTS

| | | |
|---|---|---|
| JP | 2-97830 | 4/1990 |
| JP | 9-150627 | 6/1997 |
| JP | 10-213330 | 8/1998 |
| JP | 11-78507 | 3/1999 |

* cited by examiner

*Primary Examiner*—William E. Tapolcai
(74) *Attorney, Agent, or Firm*—Antonelli, Terry, Stout and Kraus, LLP.

(57) ABSTRACT

The present invention is to provide a cooling method and a cooling apparatus in which a thermal storage and a cooling in a vehicle, in particular in an automobile, are provided with the minimum electric power consumption, and an idling of an engine necessary for the cooling during the automobile stopping time is unnecessary. The cooling method includes performing a thermal storage by producing ice in the vehicle by utilizing a surplus electric power, and after stopping the engine, operating an air blowing fan, introducing an air to be cooled into a duct, which is cooled from outside thereof by the ice, and carrying out a heat exchange between the air and the ice, and with a cold air introduced from the duct cooling an interior portion of the vehicle.

11 Claims, 2 Drawing Sheets

(a)

(b)

COOLING METHOD FOR INTERIOR PORTION OF VEHICLE AND COOLING APPARATUS THEREOF

TECHNICAL FIELD

The present invention relates to a cooling method for an interior portion of a vehicle and a cooling apparatus thereof, and in particular to a method for carrying out a cooling by producing ices in an ice making machine and by cooling an air in an operation room etc., using the ices and a cooling apparatus thereof.

BACKGROUND TECHNIQUE

In a conventional vehicle use air-conditioner of an automobile etc., to obtain a driving force of a compressor from a driving source of an engine, after an engine stopping, the air-conditioner does not work to function. Further, in a case of an electric driving system air-conditioner, since the air-conditioner is used to connect to a power supply of a battery, a consumption of electric power becomes excessively large and it is impossible to use the air-conditioner during a long time.

As an automobile use cooling apparatus, which utilizes an ice making and a thermal storage and can be used during an engine stopping time, an ice making system cooling apparatus is disclosed in U.S. Pat. No. 4,129,994, for example. In this cooling apparatus, a refrigerator having an ice making function is driven by an auxiliary battery or a battery equipped to the automobile, and a part of water in a cooling water storage container or water solution is frozen and is thermally stored.

During a cooling time, the cooling water in the cooling water storage container is forced to circulate to an air cooling use heat transfer pipe installed to an air cooling room using an electric driven pump. After a heat exchange has been carried out between the cooling water and air being sent to the air cooling room using an air blower fan, and after a heat exchange has been carried out between the cold air and the air being sent in the air cooling room, the cold air is discharged to the air cooling room outside, then the cooling in the automobile is carried out.

However, since the above stated ice making use refrigerator is driven by the battery, it is limited to one having a low refrigerating function or a consumption of electric power, and, during the thermal storage time, before the cooling water storage container has frozen completely, since it is necessary to stop the refrigerator, it is impossible to obtain an effective thermal storage.

Further, during the cooling time, in addition to the air blower fan, since it is necessary to drive the electric driven pump for circulating full-time the cooling water by the electric power from the battery, it causes the trouble in which the consumption of electric power during the cooling time becomes high.

Further, for a use except for the automobile, as an apparatus for cooling by giving a cold heat haven by a cold heat material such as the ices, for example, there is a handy type cooling apparatus shown in Japanese patent laid-open No. Hei 2-97830 and Japanese patent laid-open No. Hei 10-213330.

In the former apparatus, the cold water obtained by fusing the ices stored in an ice box is utilized as a cold heat source but this has no ice making function. In the latter apparatus, utilizing the late-night broadcasting, by flowing continuously water on an ice making plate an ice plate is formed and an outside air is forced to pass through the spaces of the peeled and crushed ices by the air blower fan and then a direct cooling is performed.

The above stated apparatuses do not aim to use the air-conditioning of the automobile, etc., and in the former apparatus it is necessary to add ice to the ice box, and the latter apparatus has a complicated structural ice making machine.

Since it is necessary to install a pump for circulating continuously the water and a means for peeling and crushing the plate like ices from the ice making plate, a quantity of electric power used becomes high, and further it is necessary to discharge the water, which is generated by condensing the moisture content in air; accordingly, it cannot be suitably used for the operating room in the automobile.

As a result, the main problem resides in that during the vehicle running time of the automobile, etc., how is the thermal storage performed, and after stopping the engine, how is the cooling function provided in the operation room or a napping room only using a small electric power supply from the battery.

The present invention can solve the above stated problems, and in particular the thermal storage and the cooling for the automobile is provided simply with a minimum quantity of electric power consumption, and an idling of the engine necessary for the cooling during the automobile stopping time can be avoided.

DISCLOSURE OF INVENTION

The present invention is to provide a system having a function for cooling a room by utilizing effectively a surplus electric power and by producing ices and performing a thermal storage; and after an engine stopping, by rotating a fan with only a small electric power supply from a battery, and by carrying out a heat exchange between the air in a vehicle and thermal storage ices.

Namely, to solve the above stated problems, the present invention provides a cooling method for a vehicle by utilizing surplus electric power to carry out thermal storage by producing the ices, and after stopping the engine the air blower fan is forced to operate, an air to be cooled is introduced in a duct, which is cooled by the ices outside the duct, and the heat exchange is carried out between the air and the ices and an interior portion of the vehicle is cooled by the cold air discharged from the duct.

Further, the present invention is to provide a vehicle use cooling apparatus having an ice making means utilizing surplus electric power, a thermal storage means, an air blower cooling means for introducing an air to be cooled and for carrying out a heat exchange between the air and the ices, and a box body for accommodating these means.

MOST PREFERRED EMBODIMENT FOR CARRYING OUT THE INVENTION

Hereinafter, the present invention will be explained in detail referring to drawings about a case of a vehicle being an automobile.

Figure 1:
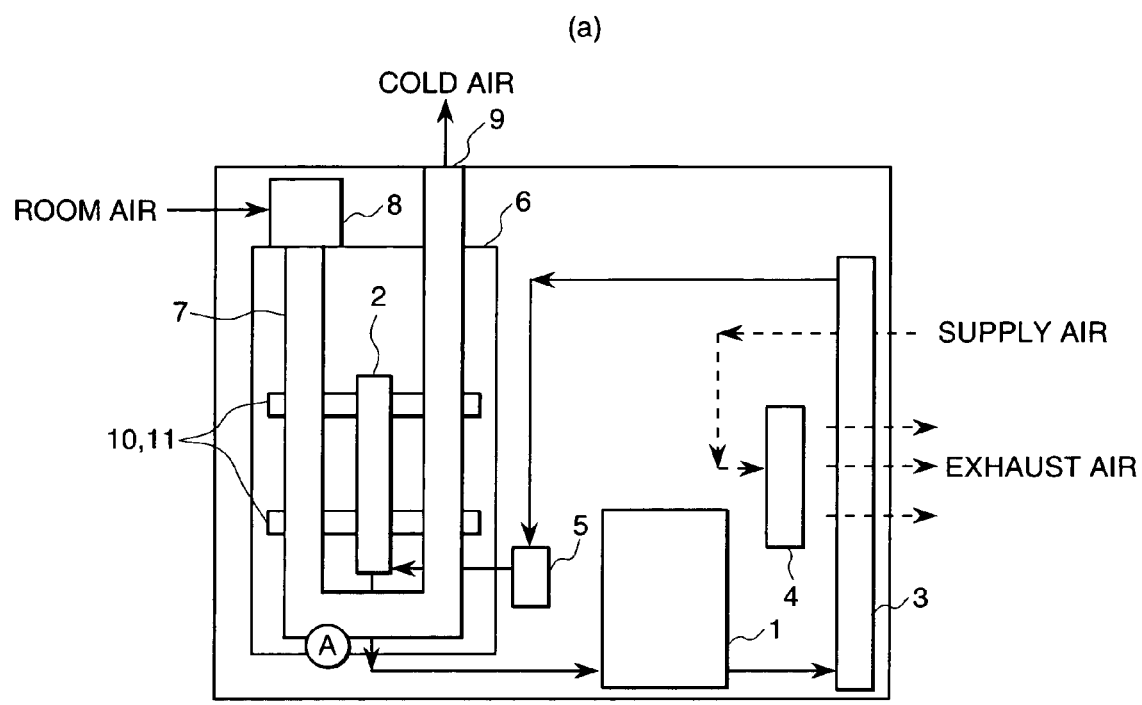
FIG. 1(a) is a cross-sectional schematic view showing one embodiment of a vehicle use ice making thermal storage system cooling apparatus according to the present invention.
FIG. 1(b) is a cross-sectional schematic view showing one embodiment of a treatment means of moisture content condensing water in an air of a cooling apparatus according to the present invention.
Figure 1:
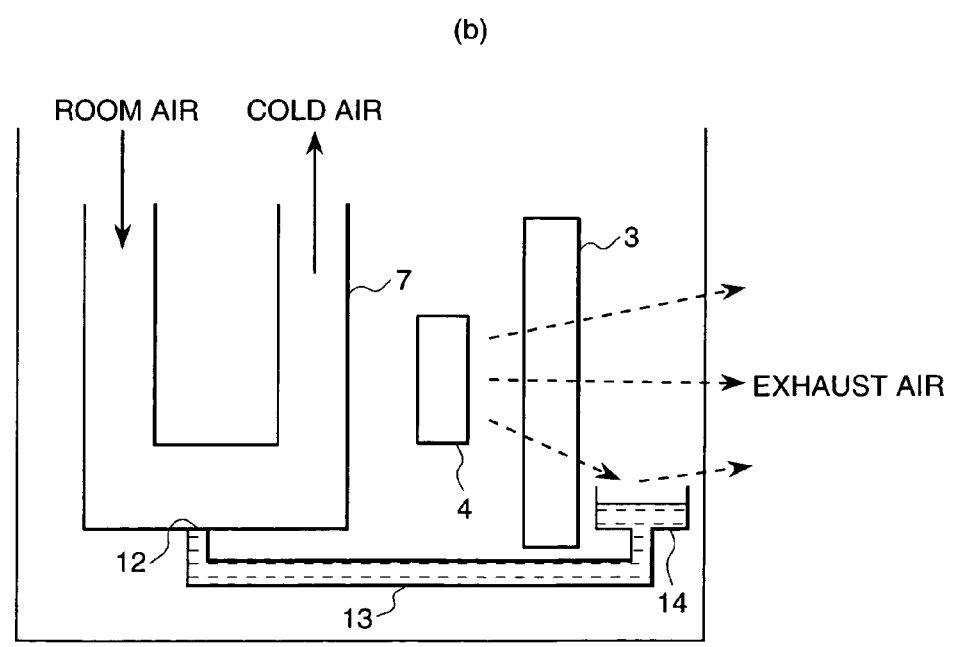

FIG. 1(a) shows one structural example of an automobile use cooling apparatus according to the present invention. An ice making machine as an ice making means is constructed according to a common refrigerant refrigerating cycle and is comprised of a refrigerant compressor (1), an evaporator (2), a condenser (3), a condenser use fan (4) and an expansion valve (5) etc., and usually these components are connected using copper or aluminum pipes.

In the present invention, since the evaporator (2) is installed in a thermal storage container (6) accommodated with the ices and cools the surrounding water and freezes the water, then the water is stored in the thermal storage container (6) being a thermal storage means.

Namely, the refrigerant is compressed by means of a refrigerant compressor (1) and becomes a gas having a high temperature and a high pressure. This high temperature and high-pressure gas like refrigerant is introduced into the condenser (3) and cooled by the condenser use fan (4) and becomes a liquid having a high temperature and a high pressure.

Next, the dusts and the moisture contents of this liquid like refrigerant are removed by a receiver and a drier (not shown in figure). This high temperature and high pressure gas like refrigerant is expanded abruptly by the expansion valve (5) and becomes a mist like refrigerant having a low temperature and a low pressure.

Next, this mist like refrigerant is introduced into the evaporator (2) and deprives the heat in the surrounding thermal storage container (6) and becomes the gas like refrigerant and is circulated into the refrigerant compressor (1) and thus this process is carried out repeatedly. On the other hand, the water in the above thermal storage container (6) produces the ices by the cooling.

Further, as an air blowing and cooling means, in the thermal storage container (6), a ventilating duct (7) for introducing the air to be cooled and for carrying out the heat exchange is installed. Namely, the air in the automobile operating room is introduced into the apparatus by the air blowing fan (8) and during the passing-through time in the ventilating duct the heat is deprived by the ices, which exist in the surrounding portion outside the duct, and becomes a cold wind and then is discharged from a ventilating duct outlet (9) into the operation room.

Figure 2:
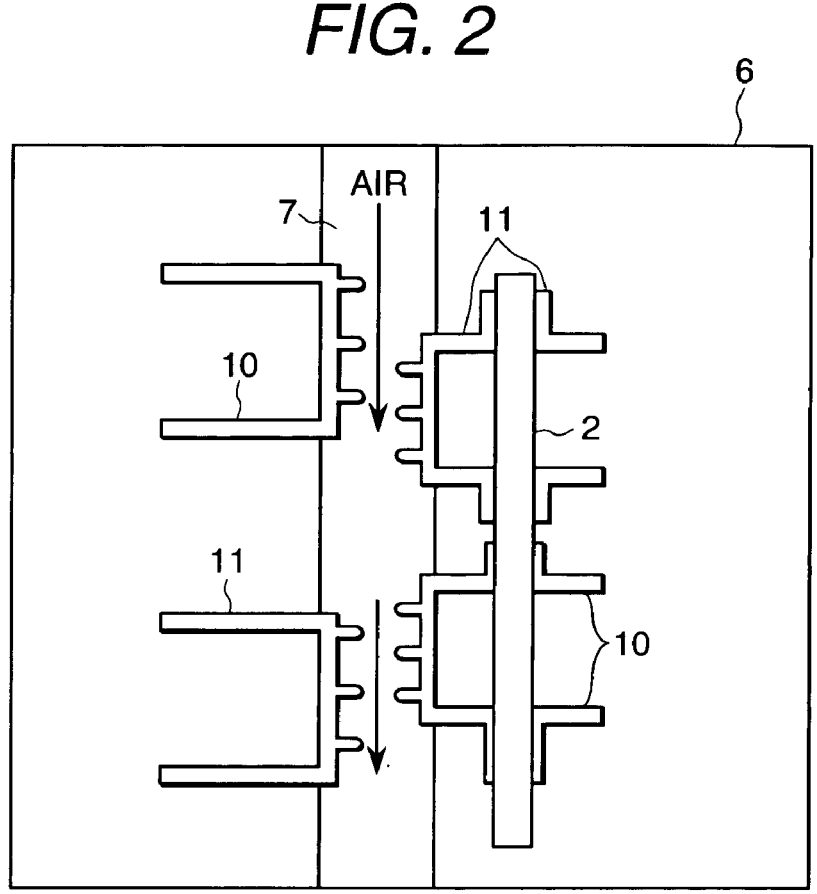
FIG. 2 is a cross-sectional schematic view showing one embodiment of a cooling apparatus according to the present invention, in which heat radiating fins are installed on an inner side and an outer side of an air cooling use ventilation duct and on an evaporating means.

Further, to promote the heat transfer with the ices and to carry out the ice making and the thermal storage in a short time, as shown in FIG. 2, to inner and outer heat transfer surfaces of the ventilating duct, heat radiating fins (10) made of aluminum or copper or micro-heat pipe type heat radiating fins (11) may be installed. Accordingly, it can cool easily down to −50° C., for example.

As the air to be cooled, in addition to the air in the above operating room, the air in the passenger cabin, the driver's cabin or the napping room, etc., are cited.

The ice making machine utilizes suitably the surplus electric power, which is generated during the automobile running time, and operates until all liquid in the thermal storage container is frozen; however, it is not limited to them. In this case, to promote the heat transfer between the evaporator and the water, as shown in FIG. 2, to a surface of the evaporator the heat radiating fins (10) made of aluminum or copper or the micro-heat pipe type heat radiating fins (11) may be installed.

During the ice making time, the exhaust heat occurs from the condenser but this is discharged by the condenser use cooling fan (4) to the apparatus outside. This heat may be discharged into the operating room or may be discharged directly to outside of the operating room by the installation of an exhaust duct.

When the exhaust heat is discharged in an interior portion of the operating room, by operating the cooling apparatus, which is installed in the interior portion of the automobile, the temperature rise in the operating room can be prevented. When the exhaust heat is discharged directly to outside of the automobile, the condenser cooling use air is fed to outside the automobile through a feeding air duct, and then the temperature of the air in the operating room is gotten of to come under influence.

After stopping the engine, the operating room is cooled by operating only air blowing fan (8) by a battery of the automobile or a charging type battery, which is incidental to this apparatus, until all of the ices of the thermal storage container put to the freeze. In this time, in an inner portion of the ventilating duct (7), the moisture contents in the air are condensed and water is generated. In a suitable case, water disposal means is installed.

For example, this water, as shown in FIG. 1(b), flows from a condensing water discharge hole (12), which is installed to a lower portion of the ventilating duct (A portion of FIG. 1(a)), to a condensing water vaporizing use container (14) according to gravity, through a tube (13).

Since this condensing water vaporizing container (14) has no lid and since the water is vaporized by the warm air, which is sent from the refrigerant condenser use fan (4), with the exhaust heat, to outside the apparatus, the condensing water is not overflown from the storage container.

In the present invention, the cooling is effective during the stopping time of the vehicle but it is possible to perform the cooling during the running time.

Further, the box body for accommodating suitably the structural components of the cooling apparatus according to the present invention is not limited specifically, but in accordance with the object the shape, the material, and the size thereof can be selected.

Figure 3:
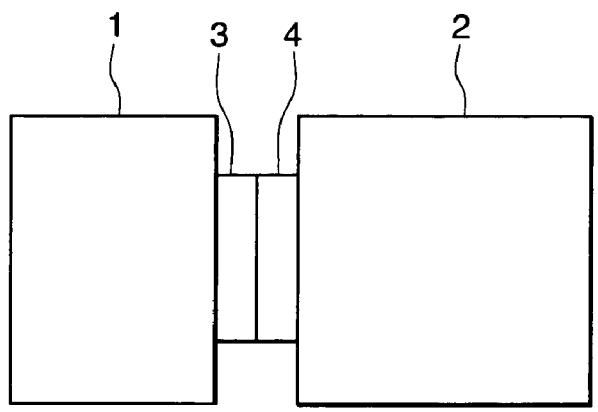
FIG. 3 is a cross-sectional schematic view showing one embodiment of a cooling apparatus according to the present invention, in which a thermal storage and air blowing means and a cooling system are installed attachable to and detachable from a separate box body, respectively.

In particular, as shown in FIG. 3, by accommodating, attachable and detachable, the thermal storage and air blowing portion (1) and the cooling system (2), by the separate box body at the boundary of the heat transfer plate (3) and the evaporator (4), only thermal storage and air blowing portion can be moved in the vehicle.

Further, the installing place of the cooling apparatus according to the present invention is ordinarily the operating room, the driver's cabin, the napping room or the cabin room of the vehicle or the surrounding portions.

However, when the shape and the capacity of the ice making machine or the thermal storage container are selected suitably, the operating time of the cooling function can be adjusted suitably.

Further, a handy type in which the cooling apparatus is installed in the operating room, an outside installing type in which the cooling apparatus is installed outside of the operating room, an automobile inner portion assembling type, etc., can be selected according to the demands.

As the ice making means, the above stated ice making machine is selected, but an electronic system cooling element using Peltier effect, a refrigerator having an ice making function, can be adapted. The thermal storing means is not limited specifically, and ordinarily the water is used but the liquid of a water liquid, a solid suspension liquid can be used.

Further, the melting point of the ices for providing the thermal storage is not limited specifically, and the melting point thereof can be adjusted according to the demands, for example, to the water a melting point adjusting agent such as salt and ethylene glycol is added suitably.

The above stated embodiment shows that the vehicle is the automobile but the method and the apparatus according to the present invention are not limited to this, but it can be adapted to any kind of vehicle. Suitably, for example, the present invention can be applied to the automobile such as the passenger car, the truck, the bus, the trailer truck, the camping car, the construction use or transporting machine such as the mixing car, the bulldozer, the crane truck, the forklift truck, the dumping truck, an agricultural use machine such as the combining truck, and the ship or the airplane such as the motor boat, the yacht, the cruising ship, the fishing ship and the sightseeing boat, etc.

INDUSTRIAL APPLICABILITY

The present invention can solve the problems of how to perform the thermal storage during the running time of the automobile, how to provide the cooling function, after the engine stops, in the operating room or the napping room with slight electric power supply from the battery, and in particular the thermal storage and the cooling in the automobile are provided with minimum quantity of electric power consumption, and then while cooling during the automobile stopping time the idling of the engine can be stopped.

What is claimed is:

1. A cooling method for an interior portion of a vehicle, comprising:
    performing thermal storage by producing ice in said interior portion of the vehicle, the vehicle mounting an internal combustion engine, by driving a compressor utilizing electric power from a battery which is mounted on the vehicle, the electric power of said battery being obtained during a rotation time of the internal combustion engine mounted on the vehicle;
    after the thermal storage, operating an air blowing means;
    introducing air into an interior portion of a duct, which is cooled by the ice surrounding an outside periphery of said duct;
    performing a heat exchange between said air introduced into said duct and the ice which is arranged surrounding the outside periphery of said duct;
    producing the ice by heat exchange between a refrigerant, which is compressed by the compressor, and water;
    cooling the vehicle using said cooled air; and
    after stopping the internal combustion engine, operating only said air blowing means, introducing the air to be cooled into said duct, conducting heat exchange between the air and the ice, to provide cooled air, and cooling the interior of the vehicle with the cooled air, whereby the interior portion of the vehicle can be cooled after stopping the internal combustion engine by operating only said air blowing means.

2. A cooling apparatus for use in a vehicle, comprising:
    an ice making means which makes ice by driving a compressor utilizing electric power from a battery which is mounted on the vehicle, the vehicle mounting an internal combustion engine, the electric power of said battery being obtained during a rotation time of the internal combustion engine mounted on the vehicle;
    a thermal storage means for thermal storage, by utilizing the electric power of said battery which is mounted on the vehicle;
    an air blowing and cooling means for introducing air to be cooled into an interior thereof and for performing a heat exchange between the ice, which is produced by said ice making means and arranged at an outside periphery of said air blowing and cooling means, and said introduced air;
    an ice producing means for performing a heat exchange between a refrigerant, which is compressed by the compressor, and water;
    a water disposal means, for evaporating water generated by condensing moisture contents in said air;
    a box body for accommodating said ice making means, said thermal storage means, said air blowing and cooling means, and said water disposal means in an inner portion thereof,
    wherein said air blowing and cooling means has means to cause the air blowing means to operate after stopping the internal combustion engine, so as to introduce air to be cooled into the interior of the air blowing and cooling means, perform heat exchange between introduced air and the ice, to provide cooled air, and cool an interior of the vehicle, after stopping the internal combustion engine, whereby the interior of the vehicle is cooled operating only the air blowing and cooling means.

3. The cooling apparatus for use in a vehicle, according to claim 2, wherein said water disposal means comprises a water reservoir container for storing temporarily the water and an evaporating means for evaporating the water.

4. A cooling method for an interior portion of a vehicle according to claim 1, wherein:
    during an ice producing time, adding a melting point adjusting agent to water which is cooled to form the ice; and
    a melting point of the water is controlled.

5. The cooling apparatus for use in a vehicle, according to claim 2, wherein:
    to a heat transfer surface of at least one of said ice making means and said air blowing and cooling means, heat discharging fins are installed.

6. The cooling apparatus for use in a vehicle, according to claim 2, wherein:
    said ice making means and said air blowing and cooling means are accommodated respectively in separate box bodies, and
    said ice making means and said air blowing and cooling means are used separately.

7. The cooling apparatus for use in a vehicle, according to claim 2, wherein:
    at least one of said ice making means and said air blowing and cooling means is assembled in an interior portion of the vehicle or mounted on the vehicle outside.

8. A cooling method for an interior portion of a vehicle according to claim 1, wherein said battery is the battery of the vehicle.

9. The cooling apparatus for use in a vehicle according to claim 2, wherein said battery is the battery of the vehicle.

10. A cooling method for an interior portion of a vehicle according to claim 1, wherein all liquid, in a compartment in which the ice is formed, is formed into the ice.

11. The cooling apparatus for an interior portion of a vehicle according to claim 2, wherein said ice making means forms all liquid, in a compartment in which the ice is to be made, into the ice.

* * * * *